United States Patent [19]

Tisserat

[11] Patent Number: 4,561,682
[45] Date of Patent: Dec. 31, 1985

[54] QUICK CONNECT COUPLING

[75] Inventor: Craig R. Tisserat, Alta Loma, Calif.

[73] Assignee: Rain Bird Consumer Products Mfg. Corp., Duarte, Calif.

[21] Appl. No.: 414,786

[22] Filed: Sep. 3, 1982

[51] Int. Cl.⁴ ............................................. F16L 37/14
[52] U.S. Cl. .................... 285/305; 285/319; 285/423
[58] Field of Search ............. 285/305, 308, 317, 319, 285/404, 321, 423

[56] References Cited

U.S. PATENT DOCUMENTS

| | | |
|---|---|---|
| 404,429 | 6/1889 | Pearce et al. . |
| 489,107 | 1/1893 | Storz . |
| 700,798 | 5/1902 | Morris, Jr. . |
| 724,324 | 3/1903 | Parsons . |
| 1,217,041 | 2/1917 | Martz . |
| 1,248,558 | 12/1917 | Scribner . |
| 1,489,310 | 4/1924 | Critchlow ............... 285/305 X |
| 1,513,710 | 10/1924 | Lewis ...................... 285/305 X |
| 1,971,578 | 8/1934 | Richardson . |
| 2,023,428 | 12/1935 | Liebhardt ............... 285/317 X |
| 2,132,506 | 10/1938 | Allen . |
| 2,250,199 | 7/1922 | Kelly . |
| 2,257,321 | 9/1941 | Arnold . |
| 2,419,702 | 4/1947 | Barnes . |
| 2,816,779 | 12/1957 | Jensen . |
| 3,342,510 | 9/1967 | Walters . |
| 3,346,277 | 10/1967 | Ludwig ................... 285/321 X |
| 3,357,721 | 12/1957 | Hollanszky et al. . |
| 3,381,984 | 8/1974 | Kutina et al. . |
| 3,382,892 | 5/1968 | Cerbin . |
| 3,428,340 | 2/1969 | Pelton ..................... 285/308 X |
| 3,645,562 | 2/1972 | Fandetti et al. . |
| 3,753,582 | 8/1973 | Graham ...................... 285/305 |
| 3,758,137 | 9/1973 | Kershaw . |
| 3,877,731 | 4/1975 | Kraus et al. . |
| 3,990,727 | 11/1976 | Gallagher . |
| 4,145,076 | 3/1979 | Snow ........................... 285/305 |
| 4,216,982 | 8/1980 | Chow . |
| 4,244,608 | 1/1981 | Stuemky .................... 285/305 |

FOREIGN PATENT DOCUMENTS 2839635 4/1979 Fed. Rep. of Germany ...... 285/305

Primary Examiner—Dave W. Arola
Attorney, Agent, or Firm—Fulwider Patton Rieber Lee & Utecht

[57] ABSTRACT

A quick connect coupling is provided for quick and easy connection or disconnection of a pair of conduits, such as ordinary garden hose. The coupling comprises interlocking tubular male and female fittings adapted for respective connection to a pair of hoses, wherein the male fitting includes a male member with an external circumferential groove positioned for axial alignment with a generally opposed pair of arcuate slots in a female member on the female fitting. A generally C-shaped retainer is carried about the female member and includes a pair of locking arms projecting from a central base generally through the arcuate slots with their free ends engaging radially oriented cam surfaces on the female member. The locking arms are normally biased radially toward each other to position their radially inner edges within the circumferential groove in the male member to lock the coupling together. However, the locking arms are movable radially away from each other by pushing radially inwardly on the central base to move the free ends of the locking arms radially outwardly along the cam surfaces thereby displacing the arms from the circumferential groove to unlock the coupling.

24 Claims, 5 Drawing Figures

QUICK CONNECT COUPLING

BACKGROUND OF THE INVENTION

This invention relates generally to so-called quick connect couplings for rapidly connecting a pair of fluid-carrying conduits in a substantially leak-free manner. More specifically, this invention relates to an improved, simplified, and inexpensive quick connect coupling particularly designed for connection and disconnection of conduits, such as ordinary garden hose or the like.

Quick connect couplings in general are well known for quickly and releasably connecting a pair of fluid-carrying conduits or pipes in end-to-end relation, thereby providing a single elongated flow path for the fluid, yet permitting rapid separation of the conduits whenever desired. Typically, the coupling comprises slidably interfitting male and female members adapted for respective connection to adjacent ends of a pair of the conduits and associated with a releasable locking mechanism for retaining the male and female members in locked relation.

Quick connect couplings are commonly used to releasably connect ordinary garden hose or the like wherein the coupling is required to withstand relatively low fluid pressures without leakage. In this type of environment, it is highly desirable to provide a coupling constructed from a minimum number of components formed inexpensively from molded plastic or the like with a geometry permitting connection or disconnection with minimum difficulty or manipulation of parts. At the same time, however, the coupling must be sufficiently strong to withstand axial forces encountered during normal use without breakage or undesired separation.

A variety of quick connect coupling designs have been proposed in an effort to meet the design criteria set forth above. For example, according to one common hose coupling design, the male and female members are associated with a twist lock device wherein the coupling is connected by inserting the male member into the female member and then twisting the members relative to each other to seat lock tabs within locking recesses. With this type of coupling, however, the requisite twisting movement imparts a corresponding twist to the hoses which typically have a flexible plastic or rubber construction tending to return to an untwisted state thereby unlocking the coupling.

Alternative quick connect couplings for hoses have therefore been proposed wherein the male and female members can be locked or unlocked without twisting movement, such as those devices depicted in U.S. Pat. Nos. 3,990,727 and 4,216,982. However, devices of this type have generally included relatively complex locking mechanisms having a relatively large number of mechanical parts thereby increasing the cost of the coupling and the likelihood of mechanical failure. Alternatively, these devices have included relatively simple locking mechanisms which are particularly difficult to align properly for connecting and disconnecting movement or which include relatively small and frequently beveled interengageable locking surfaces such that the coupling is unable to withstand significant axial loads during use without separation or breakage.

The present invention overcomes the problems and disadvantages of the art by providing a simplified quick connect coupling design, particularly for use with ordinary garden hose and the like, wherein the coupling is formed from a minimum number of inexpensive components configured for quick and easy connection and disconnection and wherein the coupling is capable of withstanding relatively high axial loads during use without risk of separation or breakage.

SUMMARY OF THE INVENTION

In accordance with the invention, a quick connect coupling is provided for quickly and easily connecting or disconnecting a pair of fluid-carrying conduits, particularly such as garden hose, with respect to each other. The coupling comprises interlocking male and female fittings adapted for connection to a pair of hoses and for relatively close sliding reception of the male fitting into the female fitting. A retainer of simplified and preferably one-piece construction is carried about the female member and is easily manipulated for movement between a locked position with a pair of locking arms extending into a groove in the male fitting and an unlocked position permitting separation of the male fitting from the female fitting.

More particularly, in accordance with a preferred form of the invention, the male fitting is constructed from an inexpensive material, such as molded plastic to have a generally tubular shape including an appropriately sized hose connector at one end for conventional threaded connection to a hose. The hose connector is joined to a tubular male member sized and shaped for relatively close sliding reception into the female fitting and further including an external circumferential groove formed thereabout at a position generally intermediate its length. This groove is bounded by an axially opposed pair of substantially unbeveled shoulders projecting radially outwardly from a central axis of the male fitting.

The female fitting is also preferably constructed from an inexpensive molded plastic or the like to have a generally tubular shape including an appropriately sized hose connector for threaded connection to another hose and a sleeve-like female member for receiving the male member of the male fitting. Importantly, the female member defines a pair of generally opposed arcuate slots at an axial position for alignment with the circumferential groove in the male member, wherein these slots terminate at adjacent ends in a pair of generally radially oriented cam surfaces.

The retainer, which can also be formed from molded plastic or the like has a generally C-shaped configuration to include a central base and a pair of generally opposed, arcuately shaped locking arms having substantially unbeveled radially inner edges. The retainer is carried about the female member to position the locking arms generally within the arcuate slots with the free ends of the locking arms respectively contacting the cam surfaces. These locking arms are biased preferably by the inherent resiliency of the retainer to move their radially inner edges into the male member groove thereby locking the fittings together. However, when the retainer central base is depressed radially inwardly toward the female member, the locking arms are displaced radially outwardly along the cam surfaces thereby spreading the arms sufficiently to release the male member and unlock the fittings.

According to further aspects of the invention, the female fitting supports an annular seal means in a position for axial engagement by the free end of the tubular male member when the fittings are connected, thereby preventing fluid leakage. Moreover, the free end of the male member advantageously includes an external bevel to spread the locking arms when the male member is inserted into the female member, whereupon the locking arms automatically lock with the groove in the male member when the groove reaches a position in axial alignment therewith.

Other features and advantages of the invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
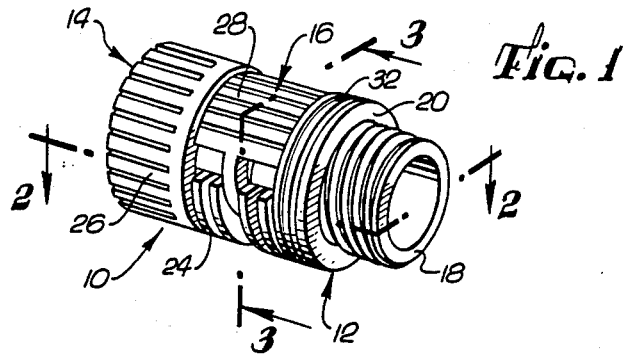
FIG. 1 is a perspective view illustrating a quick connect coupling embodying the novel features of this invention.

As illustrated in the exemplary drawings, a quick connect coupling referred to generally by the reference numeral 10 is provided for quickly and easily connecting or disconnecting a pair of fluid-carrying conduits (not shown), particularly such as ordinary garden hose or the like. The quick connect coupling 10 has a simplified and inexpensive construction including interlocking male and female fittings 12 and 14 for respective connection to a pair of hoses and a relatively simple and easily manipulated retainer 16 for locking or unlocking the fittings 12 and 14 with respect to each other. When connected, the coupling 10 provides a simple and substantially leak-free device for converting multiple hoses to a single hose of increased length.

The quick connect coupling 10 of this invention is advantageously constructed from a minimum number of parts which are configured for relatively easy manipulation to lock or unlock the coupling and which can be constructed from inexpensive materials, such as molded plastic or the like. Locking surfaces are quickly and easily aligned and displaced relative to each other while at the same time providing relatively large surface areas of engagement. Accordingly, the coupling is easy to lock or unlock yet provides relatively large area locking surfaces capable of withstanding relatively high axial forces during use without significant risk of separation or breakage.

The quick connect coupling 10 is shown in detail in FIGS. 1–5 which illustrate a preferred generally tubular interlocking geometry of the male and female fittings 12 and 14. More particularly, the male fitting 12 is constructed to include at one end a hose connector 18 of a selected standard size for appropriate connection to one hose (not shown), with a conventional male threaded hose connector being illustrated by way of example. This hose connector 18 is formed integrally with a radially enlarged flange 20 which is in turn joined to a tubular male member 22 projecting generally along a central axis 25 common to the hose connector 18. Together, the hose connector 18 and the tubular male member 22 define an uninterrupted flow path providing a continuation of the flow path formed through the hose (not shown) to which the hose connector 18 is secured.

Figure 2:
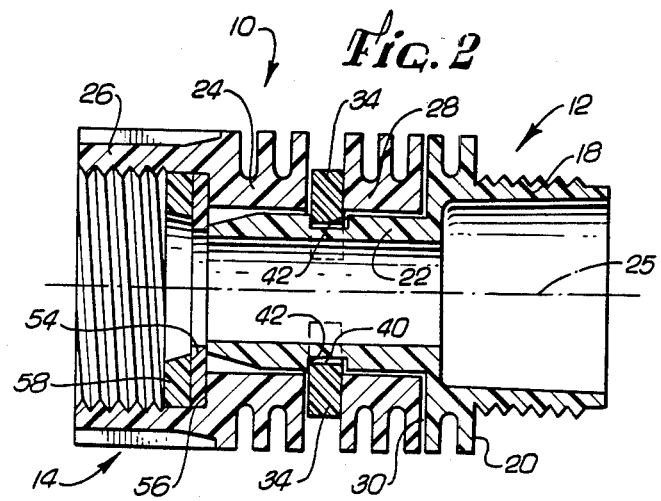
FIG. 2 is an enlarged horizontal section of the quick connect coupling taken generally on the line 2—2 of FIG. 1 and illustrating the coupling in a locked condition.

The male member 22 is sized and shaped for relatively close sliding reception into a sleevelike female member 24 at one end of the female fitting 14. This female member, as shown best in FIG. 2, is joined preferably with an integral construction to a second hose connector 26, shown by way of example in the form of a threaded female hose connector of standard size for threaded connection to a second hose (also not shown). Alternatively, if desired or required, the male and female fittings 12 and 14 can be constructed to include identical hose connectors 18 and 26 or hose connectors having any other configuration adapted for suitable connection to a pair of hoses or other conduits.

The female fitting 14 provides a support structure for the retainer 16 which is movably mounted for selective locking engagement with the male member 22 of the male fitting 12. More specifically, the retainer 16 is constructed from a relatively rigid yet somewhat resilient spring material, such as molded plastic or the like, to have a generally C-shaped configuration for reception about the female member 24 of the female fitting 14, wherein the retainer has a sufficient arcuate length and is formed on a sufficiently small radius to prevent the retainer from falling off the female member or being easily removed therefrom during normal use. The retainer comprises an arcuate and relatively thin, generally plate-shaped central base 28 having an axially elongated shape for relatively close reception into a semiannular cavity 30 formed between the hose connector 26 and an enlarged flange 32 on the female member.

The central base 28 constitutes a spring plate connected between a generally opposed pair of locking arms 34. These locking arms 34 are received respectively into a generally opposed pair of arcuate slots 36 formed in the female member 24 each to have a substantial arcuate dimension, such as on the order of about 90 to 110 degrees, as shown by the exemplary drawings. These locking arms 34 are biased by the spring characteristics of the retainer material toward a normal unstressed position with their radially inner edges 38 extending inwardly beyond the inner diameter surface of the female member 24. In this position, the radially inner edges 38 of the locking arms 34 project into a matingly shaped external circumferential groove 40 in the tubular male member 22 to lock the male member 22 against axial displacement relative to the female member 24 thereby placing the coupling 10 is a locked condition, as viewed in FIGS. 2 and 3. Conveniently, the locking arms include radially inwardly projecting shoulders 39 generally adjacent the central base 28 and positioned to engage the ends of the strip 41 of material separating the ends of the arcuate slots 36 adjacent the central base 28, whereby the shoulders 39 provide stops preventing the retainer from falling off the female member 24 during normal use.

The locking arms 34 and the groove 40 on the male member 22 are contoured to optimize the surface area engagement in the locked condition thereby maximizing the axial load which the coupling can withstand during use without separation or breakage. More particularly, the arcuate dimensions of the locking arms 34 are selected for reception into the groove 40 substantially throughout the entire arcuate width of the slots 36. Moreover, the axially opposed faces of the locking arms are shaped to extend in the radial direction substantially without beveling relative to the central axis 25, wherein the axial widths of the arms 34 are chosen for close sliding reception radially into the groove 40. These nonbeveled axial faces of the locking arms engage opposed shoulders 42 which project radially and substantially without beveling relative to the central axis 25 to define the groove 40. Accordingly, the locking arms 34 and the groove shoulders 42 provide nonbeveled locking surfaces of substantial area which will not slide axially relative to each other in response to axial loads thereby preventing undesired or accidental separation.

Figure 3:
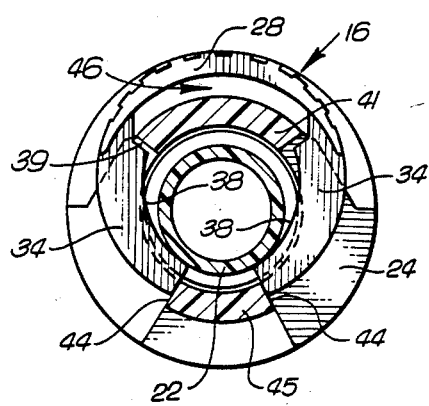
FIG. 3 is an enlarged vertical section of the coupling taken generally on the line 3—3 of FIG. 1 and illustrating the coupling in a locked condition.
Figure 4:
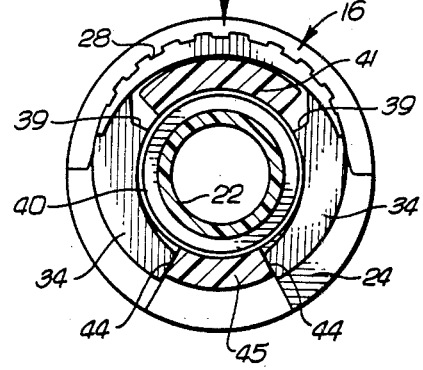
FIG. 4 is an enlarged vertical section generally similar to FIG. 3 but illustrating the coupling in an unlocked condition.
Figure 5:
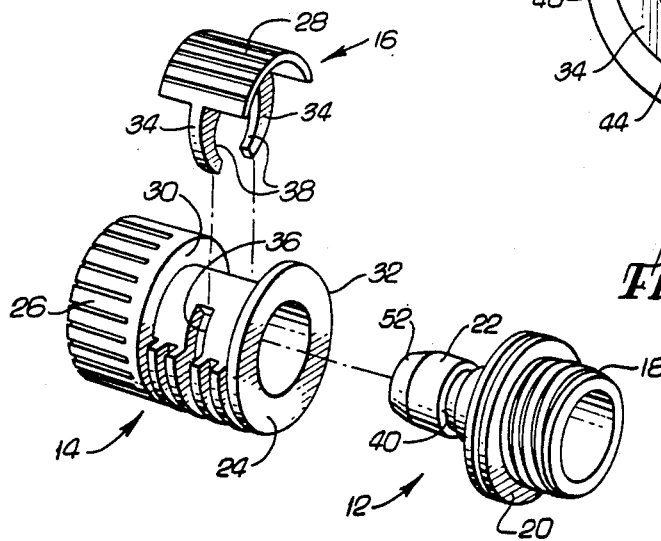
FIG. 5 is an exploded perspective view of the quick connect coupling of this invention.

In the locked condition, the free ends of the two locking arms 34 engage a respective pair of radially oriented cam surfaces 44 on the female member. These cam surfaces 44, as shown best in FIGS. 3 and 4, are formed by the circumferentially opposed faces of an arcuate strip 45 separating adjacent ends of the arcuate slots 36. Importantly, the inherent resiliency of the retainer 16 causes the locking arms to move radially toward each other to an unstressed configuration with the free ends engaging the radially innermost portions of the cam surfaces 44. In this position the retainer is offset radially from axial alignment with the male and female members, with the central base 28 of the retainer displaced radially away from the female member 24, as illustrated by the slight spacing 46 in FIG. 3.

The coupling 10 is quickly and easily unlocked by pressing radially inwardly on the central base 28 of the retainer 16 in the direction of arrow 48 in FIG. 4 to move the retainer toward a position generally in axial alignment with the male and female members. When pressed, the free ends of the locking arms 34, which are conveniently angled for mating engagement with the cam surfaces 44, are forced to displace generally tangentially and radially outwardly at a substantially uniform rate along the cam surfaces 44 thereby retracting the locking arms 34 radially outwardly from the groove 40 in the male member 22. The male member 22 can then be withdrawn from the female member 26 to unlock the coupling. This depression of the retainer 16 is advantageously accomplished easily and accurately with one hand, thereby leaving free the other hand to separate the fittings by withdrawing the male member 22. As illustrated, the hose connectors 18 and 26, the female member 24, and the central base 28 of the retainer can be externally ribbed or otherwise textured to provide roughened surfaces for easy grasping.

The coupling is quickly and easily returned to the locked condition without requiring depression of the retainer 16. More particularly, the free end of the tubular male member 22 is reduced in diameter sufficiently to permit insertion of the male member 22 between the locking arms 34. This reduced diameter end blends into a bevel 52 which radially spreads the locking arms as the male member is further inserted toward a position with the locking arms 34 in axial alignment with the groove 40, at which time the arms 34 snap radially into the groove to lock the coupling together.

Fluid leakage between the male and female fittings 12 and 14 when the fittings are connected is prevented by a relatively simple seal structure including an annular seal washer 54 placed within the hose connector 26 of the female fitting 14 in a position for engagement by the free end of the male member 22. This seal washer 54 is held against an axially presented shoulder 56 in the female fitting by a conventional hose washer 58 adapted for compressive engagement by the end of the hose to be secured to the female fitting. Alternatively, if desired, the seal washer 54 and the hose washer 58 can be combined into a single seal washer structure.

The quick connect coupling 10 of this invention thus provides a simplified and relatively inexpensive coupling device which can be used to quickly and easily connect or disconnect conduits, such as garden hose or the like. The coupling advantageously provides relatively large surface contact areas in a locked configuration to provide a high strength coupling, while at the same time permitting accurate and easy disconnecting as required in response to a single motion which can be achieved by one hand.

Various modifications and improvements to the invention described herein are believed to be apparent to one skilled in the art. Accordingly, no limitation on the invention in intended, except by way of the appended claims.

What is claimed is:

1. A quick connect coupling for releasably connecting a pair of conduits, comprising:

a first fitting for connection to one of the conduits and including a generally tubular male member having an external circumferential groove therein;

a second fitting for connection to the other conduit and including a generally sleeve-shaped female member for slidably receiving said male member, said female member defining a generally opposed pair of radially open arcuate slots and a pair of generally radially oriented cam surfaces formed generally at adjacent ends of said arcuate slots; and a generally C-shaped one-piece retainer formed from a spring material and carried about said female member and including a generally opposed pair of locking arms joined to a central base and having free ends defining cam means respectively engageable with said cam surfaces and biased toward a normal position projecting through said slots for locking reception into said groove in said male member, said locking arms each being defined by a pair of generally parallel opposed axial faces extending generally radially relative to said female member, said locking arms being movable generally tangentially relative to said female member to displace said cam means on said locking arms generally radially outwardly along said cam surfaces thereby radially spreading said locking arms sufficiently to retract said arms from said groove;

said central base of said retainer being axially elongated relative to said locking arms, and said female member having a generally semi-annular cavity formed therein for reception of said central base.

2. The quick connect coupling of claim 1 wherein said retainer is formed from a relatively rigid molded plastic having sufficient resiliency to permit movement of said locking arms a short distance generally toward and away from each other.

3. The quick connect coupling of claim 1 wherein said free ends of said locking arms are generally radially oriented for generally mating engagement with said cam surfaces.

4. The quick connect coupling of claim 1 wherein said central base is spaced radially from said female member when said locking arms are in the normal position, said central base being movable generally radially inwardly relative to said female member to displace said locking arms generally radially outwardly along said cam surfaces.

5. The quick connect coupling of claim 1 wherein said locking arms have an axial width for relatively close sliding reception through said slots and into said groove, said opposed axial faces of said said locking arms being substantially unbeveled, said slots each being defined by an axially spaced pair of generally parallel and generally radially extending walls, and said groove being defined by a pair of substantially unbeveled opposed axial shoulders.

6. The quick connect coupling of claim 1 or 5 wherein said male member includes an externally beveled free end.

7. The quick connect coupling of claim 1 wherein said locking arms are generally arcuately shaped to include radially inwardly presented edges contoured to project through said slots for locking reception into said groove throughout substantially the entire arcuate widths of said slots.

8. The quick connect coupling of claim 7 wherein said arcuate slots each have an arcuate width on the order of from about 90° to about 110°.

9. A quick connect coupling for releasably connecting a pair of conduits, comprising:
a first fitting for connection to one of the conduits and including a generally tubular male member having an external circumferential groove therein;
a second fitting for connection to the other conduit and including a generally sleeve-shaped female member for slidably receiving said male member, said female member defining a generally opposed pair of radially open arcuate slots and a pair of generally radially oriented cam surfaces, said arcuate slots each having an arcuate width on the order of from about 90° to about 110°,
a generally C-shaped one-piece retainer formed from a spring material and carried about said female member and including a generally opposed pair of locking arms said locking arms being generally arcuately shaped to include radially inwardly presented edges contoured to project through said slots for locking reception into said groove throughout substantially the entire arcuate width of said slots, and said locking arms being joined to a central base and having free ends defining cam means respectively engageable with said cam surfaces and biased toward a normal position projecting through said slots for locking reception into said groove in said male member, said locking arms each being defined by a pair of generally parallel opposed axial faces extending generally radially relative to said female member, said locking arms being movable generally tangentially relative to said female member to displace said cam means on said locking arms generally radially outwardly along said cam surfaces thereby radially spreading said locking arms sufficiently to retract said arms from said groove;
said locking arms further including generally radially oriented shoulders adjacent said central base for engaging the adjacent ends of said arcuate slots opposite said cam surfaces to prevent removal of said retainer from said female member.

10. The quick connect coupling of claim 1 including seal means for preventing fluid leakage between said first and second fittings.

11. The quick connect coupling of claim 10 wherein said seal means comprises at least one seal washer carried by said second fitting and engageable by the free end of said male member.

12. A quick connect coupling for releasably connecting a pair of conduits, comprising:
a first fitting for connection to one of the conduits and including a generally tubular male member having an external groove formed therein;
a second fitting for connection to the other conduit and including a generally sleeve-shaped female member for slidably receiving said male member, said female member defining a generally opposed pair of radially open arcuate slots and a pair of generally radially oriented cam surfaces formed generally at adjacent ends of said arcuate slots; and
a generally C-shaped retainer carried about said female member and including a pair of locking arms having cam means respectively engageable with said cam surfaces and receivable through said slots for locking reception into said groove and said male member, said locking arms each being defined by a pair of generally parallel opposed axial faces extending generally radially relative to said female member;
said retainer including a spring plate connected between adjacent ends of said locking arms for biasing said locking arms toward a normal position to project at least partially beyond the inner diameter of said female member for locking reception into said groove, said retainer being movable for displacing said cam means on said locking arms generally tangentially relative to said female member and along said cam surfaces to displace said locking arms generally radially outwardly along said cam surfaces thereby radially spreading said locking arms sufficiently to retract said arms from said groove;
said locking arms further including generally radially oriented shoulders adjacent said spring plate for engaging the adjacent ends of said arcuate slots to prevent removal of said retainer from said female member.

13. The quick connect coupling of claim 15 wherein said cam surfaces are formed on said female member, said locking arms having free ends comprising said cam means respectively engageable with said cam surfaces.

14. The quick connect coupling of claim 13 wherein said spring plate is spaced radially from said female member when said locking arms are in the normal position, said spring plate being movable generally radially inwardly relative to said female member to displace said locking arms generally radially outwardly along said cam surfaces.

15. The quick connect coupling of claim 12 wherein said locking arms have an axial width for relatively close sliding reception through said slots and into said groove, said opposed axial faces of said locking arms being substantially unbeveled, said slots each being defined by an axially spaced pair of generally parallel and generally radially extending walls and said groove being defined by a pair of substantially unbevelled opposed axial shoulders.

16. The quick connect coupling of claim 12 wherein said male member includes an externally beveled free end.

17. The quick connect coupling of claim 12 wherein said arcuate slots each have an arcuate width on the order of from about 90° to about 110° and wherein said locking arms are generally arcuately shaped to include radially inwardly presented edges contoured to project through said slots for locking reception into said groove throughout substantially the entire arcuate widths of said slots.

18. The quick connect coupling of claim 12 including seal means for preventing fluid leakage between said first and second fittings.

19. A quick connect coupling for releasably connecting a pair of conduits, comprising:
   a first fitting for connection to one of the conduits and including a generally tubular male member having an external circumferential groove therein between a pair of generally parallel and radially extending shoulders;
   a second fitting for connection to the other conduit and including a generally sleeve-shaped female member for slidably receiving said male member, said female member defining a generally opposed pair of radially open arcuate slots each formed between an axially spaced pair of generally parallel and radially extending walls and a pair of generally radially oriented cam surfaces positioned generally at adjacent ends of said arcuate slots; and
   a generally C-shaped retainer including a pair of generally opposed locking arms interconnected by a central base, said retainer being carried about said female member with said locking arms received into said slots and having their free ends defining cam means engageable with said cam surfaces, said retainer having a normal configuration with said locking arms projecting through said slots for locking reception into said groove in said male member and with said central base spaced radially from said female member, said locking arms each being defined by a pair of generally parallel opposed axial faces extending radially relative to said female member, said central base being movable generally radially inwardly relative to said female member to displace said cam means on said locking arms generally radially outwardly along said cam surfaces thereby radially spreading said locking arms sufficient to retract said arms from said groove;
   said locking arms further including generally radially oriented shoulders adjacent said central base for engaging the adjacent ends of said arcuate slots to prevent removal of said retainer from said female member.

20. A quick connect coupling for releasably connecting a pair of conduits, comprising:
   a first fitting for connection to one of the conduits and including a generally tubular male member having an external groove formed generally intermediate its length wherein said groove is defined by axially opposed, substantially unbeveled shoulders;
   a second fitting for connection to the other conduit and including a generally sleeve-shaped female member for slidably receiving said male member, said female member defining a generally opposed pair of arcuate slots and a pair of generally radially oriented cam surfaces positioned generally at adjacent ends of said arcuate slots; and
   a generally C-shaped retainer including a pair of generally opposed locking arms interconnected by a central base, said locking arms having an axial width for relatively close reception through said slots and into said groove and further including substantially unbeveled opposed axial faces, said retainer being carried about said female member with said locking arms received into said slots and having their free ends defining cam means engageable with said cam surfaces, said retainer having a normal configuration with said locking arms projecting through said slots for locking reception into said groove in said male member and with said central base spaced radially from said female member, said central base being movable generally radially inwardly relative to said female member to displace said cam means on said locking arms generally radially outwardly along said cam surfaces thereby radially spreading said locking arms sufficiently to retract said arms from said groove;
   said locking arms further including generally radially oriented shoulders adjacent said central base for engaging the adjacent ends of said arcuate slots to prevent removal of said retainer from said female member.

21. The quick connect coupling of claim 20 wherein said male member includes an externally beveled free end.

22. The quick connect coupling of claim 20 wherein said locking arms are generally arcuately shaped to include radially inwardly presented edges contoured to project through said slots for locking reception into said groove throughout substantially the entire arcuate widths of said slots.

23. The quick connect coupling of claim 20 wherein said arcuate slots each have an arcuate width on the order of from about 90° to 110°.

24. The quick connect coupling of claim 20 including seal means for preventing fluid leakage between said first and second fittings.

* * * * *

UNITED STATES PATENT AND TRADEMARK OFFICE
CERTIFICATE OF CORRECTION

PATENT NO. : 4,561,682

DATED : December 31, 1985

INVENTOR(S) : Craig R. Tisserat

It is certified that error appears in the above-identified patent and that said Letters Patent is hereby corrected as shown below:

In Column 4, line 56, delete "is" and insert therefor --in--.

In Column 7, line 9, delete the second word "said".

In Column 7, line 40, delete the "," and insert therefor --;--.

In Column 8, line 48, delete "15" and insert therefor --12--.

Signed and Sealed this

Fourth Day of November, 1986

[SEAL]

Attest:

DONALD J. QUIGG

Attesting Officer

Commissioner of Patents and Trademarks